Patented Nov. 10, 1953

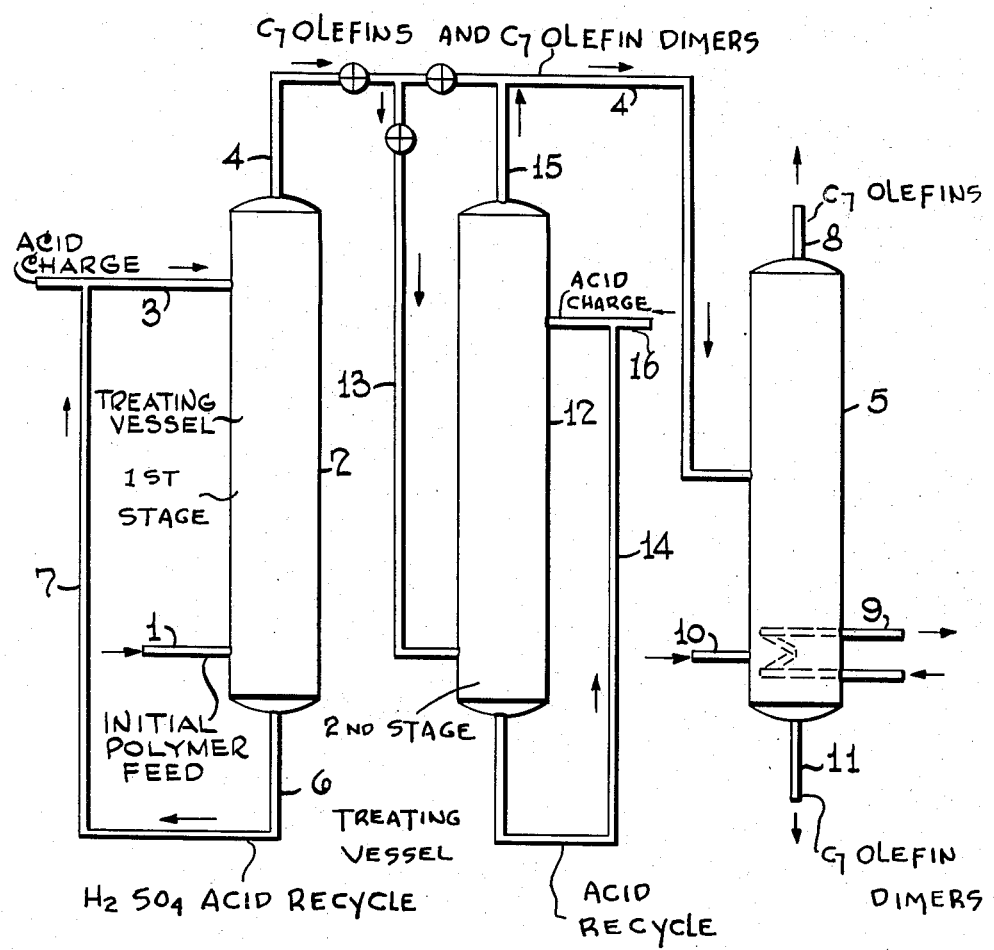

2,658,932

UNITED STATES PATENT OFFICE 2,658,932

TREATMENT OF COPOLYMER OLEFINS FOR OXONATION

Charles A. Cohen, Roselle Park, and Clifford W. Muessig, Roselle, N. J., assignors to Standard Oil Development Company, a corporation of Delaware Application May 26, 1951, Serial No. 228,508

4 Claims. (Cl. 260—683.15)

This invention relates to a process for enriching an oxo reaction olefinic feed with certain types of branched olefin polymers, particularly under conditions that permit the olefinic hydrocarbons treated and reacted to be readily recovered.

Complex mixtures containing mainly $C_7$ to $C_{12}$ olefin polymers with various degrees of branchiness are formed by non-selective polymerization of propene-butene feeds contacted under pressures of 150 to about 1200 p. s. i. g. pressure for 20 to 200 seconds with phosphoric acid at 400° F.–500° F. This type of polymerization process has been described in the art as the U. O. P. process.

When the non-selective polymerization is operated to obtain maximum yields of $C_7$ polymers by having up to 50% of normal butene and isobutene copolymerize with propene, a larger amount of the polymers formed have a structure less suitable for reacting with carbon monoxide and hydrogen in what is known as the oxonation reaction.

It is an object of the present invention to provide an economically feasible method of treating branched polymers having mainly 7 carbon atoms per molecule to concentrate those that are more satisfactorily oxonated and to separate the remainder of the polymers as useful hydrocarbons.

Although relatively weak aqueous solutions of sulfuric acid have been known to have a hydrating effect on lower olefins and strong sulfuric acid solutions at more elevated temperatures have been known to have a polymerizing action on lower olefins, it appears that there has not been any knowledge hitherto about a selective polymerization effect of dilute aqueous sulfuric acid on mixtures of branched olefin polymers having at least 7 carbon atoms per molecule, especially the complex propene-butene copolymer mixtures.

The present invention is based on a discovery of the effects of sulfuric acid controlled to have a strength in the range of 60 to 75 wt. per cent $H_2SO_4$ at temperatures ranging from 40° F. to about 100° F. on short contact with the $C_7$ branched olefin polymer mixtures. Using these conditions it was found that while a portion of the polymers became transformed to higher molecular weight polymers, substantially all the hydrocarbons separate as a hydrocarbon liquid phase from the moderately low temperature aqueous acid solution. By decanting the hydrocarbon liquid phase product, then fractionally distilling therefrom $C_7$ olefin polymers boiling in the range of 165° F. to 190° F., an olefin polymer product was collected for a comparative oxonation reaction test. The oxonation test demonstrated that the thus treated $C_7$ polymers are substantially better adapted for oxonation leading to good yields of desired $C_8$ alcohols that form certain improved ester plasticizers.

The dilute sulfuric acid treatment at moderately low temperatures was accordingly found to lend itself to an effective, though simple, operation which will be described with references to the diagrammatic flow plan in the accompanying drawing.

In the drawing, a continuous feed stream of mixed propene-butene copolymers is represented as being introduced by line 1 into a lower part of a treating vessel 2 to pass countercurrently to a stream of the dilute aqueous sulfuric acid introduced as a continuous stream from line 3 at an upper part of vessel 2. Any desired means for increasing mixing or intimately contacting the countercurrent streams may be used in this connection.

The streams of material may be contacted for a period of 5 to 60 minutes in vessel 2 while having from ½ to 10 volumes of the dilute acid per volume of hydrocarbon in the treating zone of vessel 2.

The hydrocarbon stream remaining as a separate liquid phase on reaching the top of the treating zone, above the inlet 3 of the acid stream is withdrawn through line 4 to a fractional distillation zone in tower 5.

The used dilute sulfuric acid reaching the bottom of the treating zone in vessel 2 is withdrawn by line 6 at a point below the inlet 1 of the hydrocarbon feed. This withdrawn acid tends to contain only a small amount of the polymers and can be directly returned to the treating vessel 2 by line 7 for reuse, because on further contact with the upflowing countercurrent hydrocarbons undergoing treatment, these polymers are washed out of the dilute acid. Thus, the acid can be repeatedly used without undergoing change in strength and without requiring additional steps of recovering the acid.

The treating vessel 2 may be provided with ordinary means for maintaining controlled temperatures, but since the treatment is carried out suitably at average room or moderate temperatures of about 40° F. to 100° F. no heating is necessary, nor is refrigeration ordinarily required.

Since the treatment reaction loses selectivity when the acid strength approaches 75 vol. per cent $H_2SO_4$ and since at acid strengths approaching 50 vol. per cent $H_2SO_4$ the treatment reaction becomes extremely slow, the treatment with acid strengths varying within the range of 75 to 60% is advantageously carried out in more than one stage. For example, in an initial stage 60 to 70% strength $H_2SO_4$ acid may be used at temperatures of 50° to 100° F., then, in a second stage the hydrocarbons may be contacted with between 70 and 75% strength acid at 40° to 70° F.

Under the conditions of operation set forth, if the acid strength is higher than 75 vol. per cent $H_2SO_4$, then the entire mixture of olefin polymers tends to undergo reaction. The test results indicate the critical requirements of the operation.

In the distillation column 5 the hydrocarbons are heated to vaporize and distill off $C_7$ to $C_{12}$ olefin polymers, which are sufficiently more volatile than the higher molecular weight polymers formed in the treatment. The distilled polymers can be withdrawn by overhead line 8. An ordinary reboiling steam coil 9 in the bottom part of column 5 may supply the needed heat for distillation or steam may be injected directly by line 10. The by-product $C_{14+}$ polymers are withdrawn as bottoms product by line 11.

Additional treating vessel 12 is connected into the operation for giving the $C_7$ to $C_{12}$ polymers a second stage treatment, when they are passed thereto by line 13. Here again the acid can be recycled by line 14 as in the first stage, and the treated polymers are passed by line 15 to line 4. Fresh acid charge and makeup acid of 70 to 75% strength may be added through line 16 to the recycled acid in line 14.

Experiments demonstrated that with $H_2SO_4$ strengths above 75% in an initial treatment of the $C_7$ olefin polymers, these materials were too drastically reacted and left less than 50% of the olefins for use in an oxo reaction. At between 60% and 70% $H_2SO_4$ strength the acid treatment proceeds smoothly on initial treatment of a feed to yield from 74 to 85% of desired product suitable for oxonation. The remainder of the hydrocarbons which were changed into higher boiling hydrocarbons were distilled under reduced pressure and indicated to be mainly dimerized products boiling in the range of $C_{14}$ to $C_{24}$ hydrocarbons.

The material balance on the system indicated that nearly all the hydrocarbon material remained in the hydrocarbon oil phase, less than about 5% of the hydrocarbon material was in the separated acid phase from which it is removed upon recontact with fresh feed. In no instance was any degradation of $C_7$ olefins to propylene or butylene observed.

TABLE I

*Treatment of branched $C_7$ olefin polymers at 40° to 100° F.*

| Acid strength vol. percent $H_2SO_4$ | R. I. 20/D of oil product | Vol. percent $C_7$ recovered |
|---|---|---|
| 50 | 1.40568 | 95+ |
| 55 | 1.40598 | 90+ |
| 60 | 1.40675 | 85 |
| 65 | 1.40805 | 80 |
| 70 | 1.40817 | 74 |
| 75 | 1.42127 | 50 |
| 80–85 | 1.43126 | 13.5 |

The refractive index was used as a quick measurement of changes in the products, and indicated that the desired effective changes occurred with acid strengths ranging from 60 to 70% $H_2SO_4$. At below 60% $H_2SO_4$, the $C_7$ distillate remained nearly the same as the original feed. At above 75% $H_2SO_4$, the treated $C_7$ product recovered began to drop excessively in yield.

The $C_7$ olefin polymers treated with approximately an equal volume 60 to 75% $H_2SO_4$ at 40°–100° F. were analyzed for change in composition by infra-red absorption. The thus treated $C_7$ olefin polymers were recovered in 55 to 85% by volume yield. Representative test results are given in the following tabulation:

TABLE II

| Olefin type analysis-Infra-Red | Original $C_7$ olefin feed | Treated $C_7$ olefin feed |
|---|---|---|
| I. $RCH=CH_2$ | 1 | 4 |
| II. $RCH=CHR'$ | 13 | 27 |
| III. $R\diagdown C=CH_2$ ($R'$) | 17 | 5 |
| IV and V. $R\diagdown C=C \diagup R''$ ($R'$, $R'''$) | 69 | 64 |

The type of olefins is according to the Boord Classification described by Schmidt and Boord, J. A. C. S., volume 54, page 751, 1932. In the formulas, R, R' and R'' represent alkyl radicals. R''' represents an alkyl radical in type V olefins and represents hydrogen in type IV olefins.

The foregoing preliminary tests were indicative that the acid treatment could increase favorably the concentration of type II branched olefins largely at the expense of type III branched olefins.

Although in the past, the type II olefins were considered relatively unsuitable for oxonation in the preparation of desirable $C_8$ alcohols used for making phthalate ester plasticizers, it was found that by having high amounts of type II with low amounts of type III present, the oxonation yielded an alcohol product approximately as good as the product of type I olefins and even superior thereto with respect to tensile strength and elongation under aging of vinyl plastics plasticized by phthalate esters of the alcohols.

A brief summary of evaluated ester plasticizers is given in the following tabulation:

TABLE III

*Phthalates from oxonated olefins evaluated as plasticizers*

| Test (averaged 7 days) | Mixed $C_7$ olefins oxonated | | | |
| | Original feed | Treated feed | 100% type II | 80% type I |
|---|---|---|---|---|
| Elongation, percent | 55 | 100 | 100 | 100 |
| Percent retention of tensile | 61 | 61 | 60 | 59 |
| Dynamic modulus ($\times 10^{-4}$ at 20° C.) | 23.8 | 24.3 | | |
| Do | | | 18.4 | 18.7 |

Conditions of oxonation used were according to standardized procedure:

Reaction of feeds with CO and $H_2$ at 350° F., 0.2% cobalt oleate, then hydrogenation of crude $C_7$ aldehyde product at 350° F. over nickel catalyst The outstanding improvement obtained with type II olefins in the oxo feed is in the elongation properties of the plasticizer.

What is claimed is:

1. The method of treating branched olefin copolymers of propenes and butenes, said copolymers having at least 7 carbon atoms per molecule, which comprises contacting said copolymers with an aqueous solution of 60% to 70% $H_2SO_4$ at 50° to 100° F. to convert less than 50 volume per cent of the copolymers to higher polymers, separating the treated copolymers with said higher polymers from the aqueous acid solution, further treating the mixture of copolymers and higher polymers with an aqueous solution of 70% to 75% sulfuric acid to obtain further dimerization while still maintaining less than 50 volume per cent of the copolymers unreacted, and separating the treated copolymers with the dimerized copolymers from the aqueous acid solution.

2. In a process of preparing a feed for oxonation from $C_7$ propene-butene copolymers, the improvement of treating said copolymers with an aqueous solution of 60% to 75% strength $H_2SO_4$ at 40° to 100° F. until between 15 and 50 volume per cent of said copolymers are dimerized, removing the dimerized copolymers with the remaining treated $C_7$ copolymers from the aqueous solution, distilling the $C_7$ copolymers thus treated from the dimerized copolymers to obtain a distillate having an increased content of $C_7$ propene-butene co-polymers in which the double bond links together secondary carbon atoms.

3. The method of treating a mixture of branched heptenes which are co-polymers of propene and butenes including a substantial proportion of heptenes having the double bond between secondary carbon atoms and a substantial proportion of heptenes having a double bond between a tertiary carbon and a primary carbon, which comprises treating said mixture of copolymers by contact with 60–75% strength sulfuric acid in aqueous solution at 40° to 100° F. until 15 to 50 volume per cent of said co-polymers are dimerized to leave the remaining co-polymers unchanged in molecular weight with an increased concentration of heptenes in which the double bond is between secondary carbon atoms and a decreased concentration of heptenes having a double bond between a tertiary carbon and a primary carbon, and removing the dimerized co-polymers with the unchanged co-polymers as they are separated from the aqueous solution of the acid.

4. The method of claim 3, in which a small amount of the dimerized co-polymers remain in the aqueous acid solution from which the treated co-polymers are removed and said aqueous acid solution containing the small amount of co-polymers is contacted with countercurrent stream of the co-polymers being freshly treated.

CHARLES A. COHEN.
CLIFFORD W. MUESSIG.

References Cited in the file of this patent

UNITED STATES PATENTS

| Number | Name | Date |
|---|---|---|
| 2,007,160 | Engs et al. | July 9, 1935 |
| 2,128,971 | Snow | Sept. 6, 1938 |
| 2,320,256 | Bailey | May 25, 1943 |
| 2,504,682 | Harlan, Jr. | Apr. 18, 1950 |
| 2,530,989 | Parker | Nov. 21, 1950 |
| 2,552,508 | Peters | May 15, 1951 |
| 2,557,701 | Smith | June 19, 1951 |
| 2,564,914 | Murray | Aug. 21, 1951 |